US006982832B2

(12) United States Patent
Wild et al.

(10) Patent No.: US 6,982,832 B2
(45) Date of Patent: Jan. 3, 2006

(54) OPTICALLY VARIABLE ELEMENT COMPRISING A SEQUENCE OF THIN-FILM LAYERS

(75) Inventors: Heinrich Wild, Herzogenaurach (DE); Ludwig Brehm, Adelsdorf (DE)

(73) Assignee: Leonard Kurz GmbH & Co. KG, Furth (DE)

( * ) Notice: Subject to any disclaimer, the term of this patent is extended or adjusted under 35 U.S.C. 154(b) by 0 days.

(21) Appl. No.: 10/513,521

(22) PCT Filed: Apr. 17, 2003

(86) PCT No.: PCT/EP03/04023

§ 371 (c)(1),
(2), (4) Date: Dec. 6, 2004

(87) PCT Pub. No.: WO03/095228

PCT Pub. Date: Nov. 20, 2003

(65) Prior Publication Data

US 2005/0141094 A1 Jun. 30, 2005

(30) Foreign Application Priority Data

May 14, 2002 (EP) .................................. 02010745

(51) Int. Cl.
*G02B 27/00* (2006.01)

(52) U.S. Cl. ...................... 359/586; 359/585; 359/584; 359/577; 359/566

(58) Field of Classification Search ................ 359/586, 359/585, 580, 584, 1, 2, 566, 3
See application file for complete search history.

(56) References Cited

U.S. PATENT DOCUMENTS 5,801,857 A * 9/1998 Heckenkamp et al. ......... 359/2
6,761,959 B1 7/2004 Bonkowski et al.

FOREIGN PATENT DOCUMENTS

WO WO 01/03945 A1 1/2001
WO WO 02/00445 A1 1/2002

* cited by examiner

*Primary Examiner*—Fayez G. Assaf
(74) *Attorney, Agent, or Firm*—Hoffmann & Baron, LLP

(57) ABSTRACT

The invention concerns an optically variable element, in particular an optically variable safeguard element for safeguarding banknotes, credit cards and the like, and a security product and a foil, in particular an embossing foil or a laminating foil, with such an optically variable element. The optically variable element has a thin film layer (54, 55, 58) for producing color change by means of interference and a further layer (51, 52, 53, 59). The thin film is in the form of a partial thin film element which covers the surface region of the further layer only in region-wise and pattern-shaped manner.

30 Claims, 8 Drawing Sheets

OPTICALLY VARIABLE ELEMENT COMPRISING A SEQUENCE OF THIN-FILM LAYERS

This application claims priority based on an International Application filed under the Patent Cooperation Treaty, PCT/EP03/04023, filed on Apr. 17, 2003, and European Patent Office Application No. 02010745.4, filed on May 14, 2002.

BACKGROUND OF THE INVENTION

The invention concerns an optically variable element, in particular an optically variable security element for safeguarding banknotes, credit cards and the like, which has a thin film for producing color shifts by means of interference. The invention further concerns a security product and a foil, in particular an embossing foil or a laminating foil, which has such an optically variable element.

Optically variable elements are frequently used to make it difficult to copy and misuse documents or products and if possible to prevent that from happening. Optically variable elements are frequently used for safeguarding documents, banknotes, credit cards, cash cards and the like.

In order to make it difficult to copy optically variable elements, it is known for an optically variable element to be provided with a thin film layer succession which produces color shifts by means of interference, in dependence on the viewing angle.

WO 01/03945 A1 describes a security product having a transparent substrate, to one side of which is applied a thin film which produces a perceptible color shift in dependence on the change in the angle of view. The thin film comprises an absorption layer which is applied to the transparent substrate and a dielectric layer which is applied to the absorption layer. The absorption layer includes a material which is made up from one of the following materials or a combination of those materials: chromium, nickel, palladium, titanium, cobalt, iron, tungsten, molybdenum, iron oxide or carbon. The dielectric layer comprises one of the following materials or a combination of the following materials: silicon oxide, aluminum oxide, magnesium fluoride, aluminum fluoride, barium fluoride, calcium fluoride or lithium fluoride.

In order further to increase the level of safeguard against copying, a diffraction pattern is embossed on the side of the transparent substrate, which is in opposite relationship to the thin film layer succession. That diffraction pattern acts as a diffraction grating so that for example the illusion of a three-dimensional image can be produced for the viewer, by means of that two-dimensional pattern.

It is further proposed that the diffractive pattern be applied by embossing to the side of the transparent substrate to which the thin film layers are also applied.

Those two embodiments of an optically variable element provide that, at each location of the optically variable element, the optical effects produced by the thin film layers and the optical effects produced by the diffractive pattern are superimposed and this therefore overall affords an optical effect which is difficult to imitate and copy.

The invention is now based on an optically variable element as is described in WO 02/00445 A1.

The optically variable element comprises here a plurality of layers which are arranged generally in mutually superposed relationship. The optically variable element has on the one hand a thin film which produces the optical effect, already described above, of a color change which is dependent on the angle of view. In addition the optically variable element has a replication layer into which a relief structure is embossed. That relief structure produces a further optical effect, namely the diffraction effect which has already been described hereinbefore and by means of which holograms and the like can be represented. In that respect, in regard to production procedure, firstly the thin film layers are applied to the replication layer and then the relief structure is embossed thereon.

As an alternative thereto, WO 02/00445 A1 describes that the optical effect produced by the thin film structure and the optical effect produced by the relief structure are decoupled from each other. Two operating procedures are proposed for that purpose.

On the one hand it is proposed that an opaque layer is applied between the relief structure which produces a holographic image by means of diffraction and the thin film which produces a color change effect. The relief structure is screened from the thin film structure by means of that opaque layer. The second possible option involves arranging two or more layers of a substantially transparent material between the relief structure producing a holographic image by diffraction and the thin film layers. Those layers can include one or more highly refractive layers and an adhesive layer. Those layers provide for an increase in reflection and thus the strength of light in the region of the relief structure producing a holographic image.

In this respect, such a variable optical element can be produced as follows: firstly a pattern is embossed into a holographic foil. That foil is then provided in region-wise manner with a metal layer. The thin film layers are then vapor-deposited in succession. Lastly, a metal layer is applied, over the full surface area.

A further possible option involves providing a prefabricated thin film layer succession with an embossable lacquer and then embossing the relief structure into that lacquer. It is further proposed that such prefabricated thin film layers can be glued to prefabricated microstructures.

WO 02/00445 A1 thus describes either using security elements in which the optical effect produced by diffractive structures and the optical effect produced by thin film structures are coupled together, or using security elements in which the optical effect produced by diffractive structures and the optical effect produced by thin film layers are decoupled from each other.

SUMMARY OF THE INVENTION

Now, the object of the invention is to make it difficult to imitate and copy optically variable elements and thus to improve the anti-forgery security of security products.

That object is attained by an optically variable element, in particular an optically variable safeguard element for safeguarding banknotes, credit cards and the like, which has a thin film for producing color shifts by means of interference and a further layer, wherein the thin film is in the form of a partial thin film element which covers the surface region of the further layer only in region-wise and pattern-shaped manner. That object is further attained by a security product and a foil, in particular an embossing foil or a laminating foil, which has such an optically variable element.

The invention achieves the advantage that an optically variable element according to the invention is substantially more difficult to copy than the optically variable elements known in the state of the art. As a result, the anti-forgery security of security products provided with an optically variable element of the configuration according to the invention is considerably increased. In particular the level of anti-forgery security is far increased in that respect in comparison with surface elements of a sandwich-like structure.

Thus for example the optically variable element described in WO 02/00445 A1—as described in WO 02/00445 A1 as a possible mode of manufacture—can be imitated by a prefabricated thin film foil being processed with an embossing stamp, with which a diffractive structure is embossed into the thin film foil. That is no longer possible with an optically variable element designed in accordance with the invention: the partial application of a thin film layer succession which produces a color shift by means of interference requires a high level of technology complication and expenditure. In comparison with a prefabricated thin film foil the partial thin film element produced in that way represents an individualised element so that imitation of the optically variable element is no longer possible, starting from a prefabricated thin film layer succession.

Further advantages in relation to previous individual representations or mutually superposed surface elements lie in better optical integration into the overall element to be protected, the specifically targeted geometrical arrangement of functional windows (machine-readability, personal data and so forth) and the choice, which can be better matched, in respect of the physical-chemical properties of the partially arranged individual elements (corrosion, intermediate layer adhesion and the like).

Advantageous configurations of the invention are set forth in the appendant claims.

The further layer is preferably a continuous protective lacquer layer, a continuous reflection layer or a continuous adhesive layer. There is however no need for the further layer to cover the entire surface region of the optically variable element. Besides the further layer, it is possible to provide additional further layers whose surface regions are covered by the partial thin film element only in region-wise and pattern-shaped manner. For example it is thus possible for the optically variable element to have a continuous protective lacquer layer, a continuous reflection layer and a continuous adhesive layer.

It is desirable for the partial thin film element to be made up of an absorption layer and a spacer layer. It is further possible for the partial thin film element to be made up from a relatively large number of layers which have alternately different refractive indices.

The level of anti-forgery security can be further increased by the partial thin film layer having a reflective layer, preferably a metal layer. That improves the recognisability of the partial thin film element.

Alternatively there is also the possibility of providing the partial thin film element with a transmission layer. In that case it is particularly advantageous for that transmission layer to be colored and thus to provide an additional security feature.

It is further possible to provide the partial thin film element with a diffractive structure, as an additional security element. Such a diffractive structure makes it possible to produce for example diffraction effects, by means of which for example holograms or defined color effects can be produced.

Imitation of the optically variable element can be made still more difficult if the partial thin film element is provided with a partial reflective layer, in particular a metal layer, which only partially covers the surface region of the partial thin film element. Besides the increase in the level of anti-forgery security that this entails, that also makes it possible to achieve attractive decorative effects. That therefore increases the array of shapes available for the design configuration of an optically variable element.

These advantages can be achieved by the partial thin film element being provided with a partial diffractive structure which only partially covers the surface region of the partial thin film element.

Those two measures, namely the partial reflective layer and the partial diffractive layer, can also be embodied in parallel.

A possible way, which enjoys production-engineering advantages, of designing a surface region, which is delimited by the partial thin film element, of the optically variable element, involves applying an absorption layer but no spacer layer in that surface region. Those advantages are further also achieved in that a spacer layer but not an absorption layer is applied in the surface region of the optically variable element which is delimited by the partial thin film element.

There is also the possibility of applying one or more substitute layers, in a surface region, which is delimited by the partial thin film element, of the optically variable element, said one or more substitute layers replacing the thin film of the partial thin film element in that surface region. Preferably, that surface region which is delimited by the partial thin film element is enclosed by the partial thin film element or encloses the thin film element. That measure makes particularly high demands on the production process. Accordingly, imitation of an optically variable element of such a configuration is made more difficult and thus the level of anti-forgery security is improved.

Advantages in regard to the following layer structure can be afforded if the overall layer thickness of the one or more substitute layers approximately corresponds to the layer thickness of the partial thin film element.

Imitation of the optically variable element can be further made more difficult if one of the one or more substitute layers is provided with a diffractive structure. That advantage is further achieved by applying, as the substitute layers, a reflection layer and a carrier layer. Alternatively it is also possible to apply a single substitute layer which for example involves a reflection layer. As described hereinafter, such a procedure can enjoy advantages from the point of view of production engineering.

As already discussed in relation to the partial thin film element, it is also advantageous, in regard to the configuration of the one or more substitute layers, for those layers to have a partially reflective layer which only partially covers the surface region of the one or more substitute layers. In that way, besides the resulting enhancement in the degree of anti-forgery security, it is also possible to achieve integrating attractive decorative effects for the security product. The array of shapes available for the design configuration of an optically variable element is enhanced in that way. Those advantages can further be achieved if the one or more substitute layers have a partial diffractive structure which only partially covers the surface region of the one or more substitute layers.

It is possible for the configurational elements 'partial thin film element with partial reflective layer', 'partial thin film element with partial diffractive structure', 'substitute layer with partial reflective layer', and 'substitute layer with partial diffractive structure' to be combined together as desired. An optically variable element according to the invention can thus have a plurality of combinations of valuable security features and affords a large number of attractive configurational features.

BRIEF DESCRIPTION OF THE DRAWINGS

The invention is described hereinafter by way of example by means of a number of embodiments with reference to the accompanying drawings in which.

DESCRIPTION OF THE PREFERRED EMBODIMENTS

Figure 1:
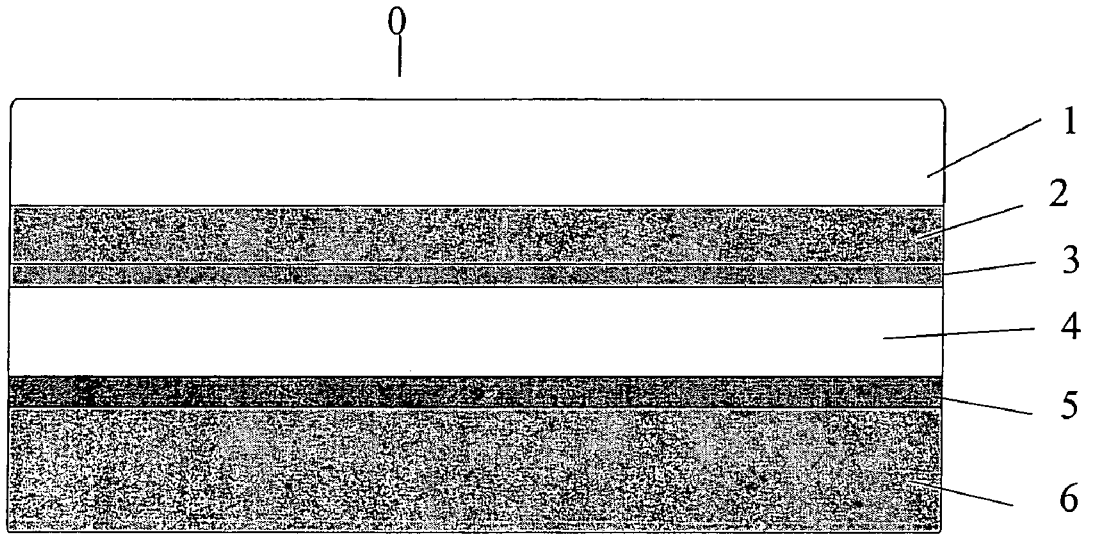
FIG. 1 shows a view in section through an optically variable element.

FIG. 1 shows the structure in principle of an optically variable element 0.

The optically variable element 0 is intended to be applied to a security product, for example a banknote, a credit card, a cash card or a document. There is also the possibility that the optically variable element is intended to be applied as a security or authenticity identification to an article, for example to a CD, or to a packaging.

The optically variable element 0 can assume many different forms. The optically variable element 0 can thus be for example a security thread which is intended to be applied to one of the above-specified objects.

FIG. 1 shows a carrier 1 and five layers 2 through 6. The optically variable element 0 is formed by the layers 2 through 6. The layer 2 is a protective lacquer and/or release layer, the layer 3 is an absorption layer, and the layer 4 is a spacer layer. The layer 5 is a metal layer or an HRI layer (HRI=High Refractive Index). The layer 6 is an adhesive layer.

The carrier 1 comprises for example PET. The carrier serves for producing the optically variable element, from the production-engineering point of view. Upon or after application of the optically variable element to the object to be safeguarded, the carrier 1 is removed. FIG. 1 therefore shows the optically variable element at a stage in which it is part of a foil, for example an embossing foil or a laminating foil.

In the case where the optically variable element 0 is part of a laminating foil, the layer 2 has a bonding layer.

In principle, a thin film is distinguished by an interference layer structure which produces color shifts which are dependent on the viewing angle. It can be in the form of a reflective element, with for example highly reflective metal layers, or in the form of a transmissive element with a transparent optical separation layer of higher refractive index (HRI) or lower refractive index (LRI), in relation to the adjoining layers. The base structure of the thin film has an absorption layer (preferably with between 30% and 65% transmission), a transparent spacer layer as a color change-producing layer (for example λ-quarter or λ-half layer) and a metal layer as a reflective or an optical separation layer as a transmitting layer.

The layers 3, 4 and 5, that is to say the absorption layer, the spacer layer and the metal layer or HRI layer form a thin film which produces color shifts dependent on the viewing angle, by means of interference. In that respect, the color shifts produced by the thin film are preferably in the range of the light which is visible to a human viewer. In addition that thin film is in the form of a partial thin film element which covers the surface region of the optically variable element 0 only in a region-wise and pattern-shaped manner.

If the layer 5 comprises a reflective layer, for example aluminum, then the layer thickness of the spacer layer 4 is to be so selected that the $\lambda/4$ condition is satisfied. If the layer 5 comprises a transmissive layer then the spacer layer 4 has to satisfy the $\lambda/2$ condition.

It is possible for the partial thin film element to be made up of a succession of high-refractive and low-refractive layers. For example the partial thin film element can be made up of between 3 and 9 such layers (odd number of thin film layers) or between 2 and 10 such layers (even number of thin film layers). The higher the number of layers, the more sharply can the wavelength be set for the color change effect.

Examples of usual layer thicknesses for the individual layers of the partial thin film element and examples of materials which can be used in principle for the layers of the partial thin film element are disclosed in WO 01/03945, page 5, line 30 through page 8, line 5, which corresponds to U.S. Pat. No. 6,761,959 to Bonkowski et al., col. 4, line 62 through col. 6, line 45, which is incorporated herein by reference.

The layer 5 can be in the form of a full-area or a partial metal layer or an HRI layer. The materials for the layer 5 can be for example Al, Ag, Cr, Ni, Cu, Au or combinations of reflective metals.

It is further possible for the layer 5 to have a structured surface. Thus it can have a diffractive structure, a refractive structure (lenses) or macroscopic structures (greater than 30 μm). It can further also have an unstructured, mirror-reflecting or scattering surface.

It is possible in principle to forego one or more of the layers shown in FIG. 1. In addition the optically variable element 0 can also have one or more further layers.

Figure 2A:
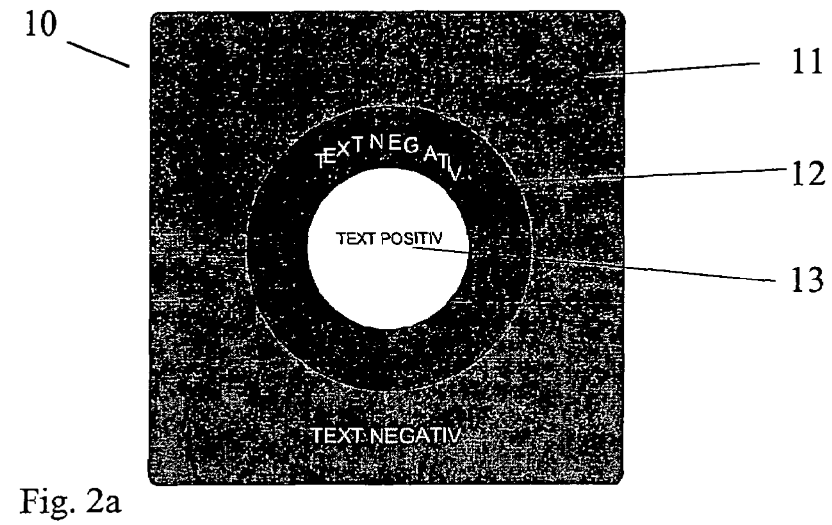
FIG. 2*a* shows a view of an optically variable element according to the invention, in a first embodiment.
Figure 2B:
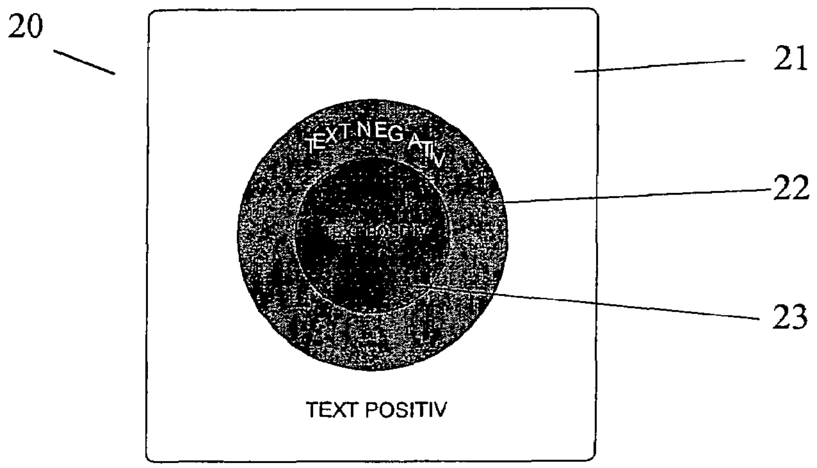
FIG. 2*b* shows a view of an optically variable element according to the invention, in a second embodiment.
Figure 2C:
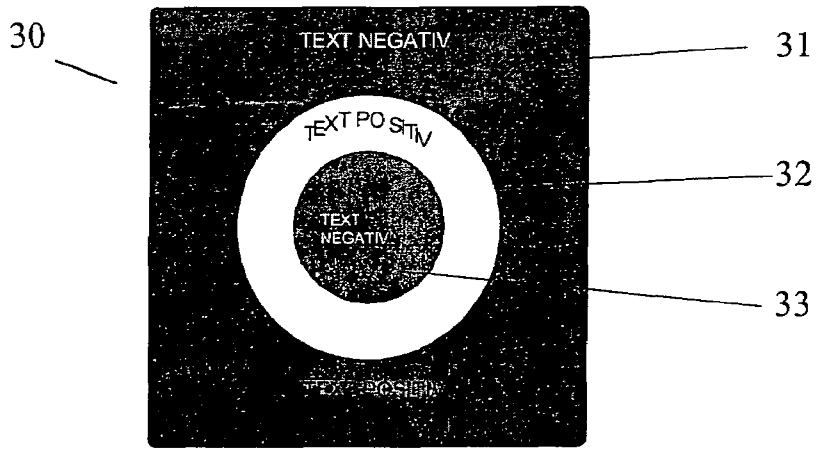
FIG. 2*c* shows a view of an optically variable element according to the invention, in a third embodiment.

FIGS. 2*a* through 2*c* show three optically variable elements 10, 20 and 30 respectively. The optically variable element 10 has three surface regions 11 through 13, the optically variable element 20 has three surface regions 21 through 23 and the optically variable element 30 has three surface regions 31 through 33.

The surface regions 12, 23 and 31 of the optically variable elements 10, 20 and 30 are each covered by a respective partial thin film element. As can be seen from FIGS. 2*a* through 2*c*, the partial thin film element is formed in each case in a region-wise and pattern-shaped manner.

It is possible in this case for the respective partial thin film element to be of a transmissive or reflective nature. A partial, pattern-shaped, both transmissive and also reflective configuration within the respective surface region makes it possible to achieve further attractive effects. In addition the surface regions 12, 23 and 31 can also be provided with a diffractive structure.

The surface regions 11, 22 and 33 of the optically variable elements 10, 20 and 30 respectively are each covered with a partial metallisation. Those surface regions can also be provided with a diffractive structure.

A respective transparent window is visible in each of the surface regions 13, 21 and 32 of the optically variable elements 10, 20 and 30. The transparent windows each have a partial transparent element. That element has transparent or transmissive properties (clear lacquer compositions, oxidic, partially metallised, scattering, transmissive, organic and inorganic compositions). Those surface regions can also be provided with a diffractive structure.

It is to be emphasised that the diagrammatically illustrated element arrangements of FIGS. 2*a* through 2*c* can all be embodied in register relationship with each other and without limitation in terms of generality, can embrace both graphic image elements, alphanumeric and geometric characters, bar codes and random patterns and combinations thereof.

Figure 3:
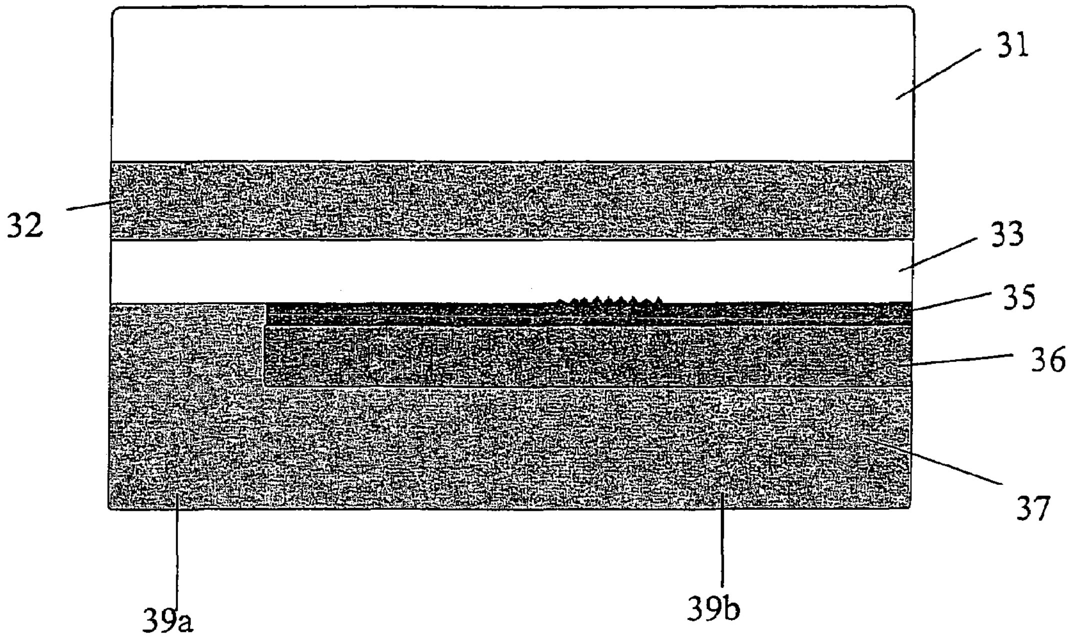
FIG. 3 shows a view in section through an optically variable element according to the invention for a further embodiment of the invention.

FIG. 3 shows a possible way of constructing an optically variable element which is provided with a partial thin film element.

FIG. 3 shows a carrier 31, five layers 32 through 37 and two surface regions 39*a* and 39*b*.

The layer 32 is a protective lacquer and/or release layer, while the layer 33 is a replication layer formed for example by a replication lacquer. The layer 35 is a metal layer or an HRI layer (HRI=High Refraction Index). The layer 36 is formed by an etching resist. The layer 37 is an adhesive layer.

To produce the layer structure, the protective lacquer and release layer 32, the replication layer 33 and the metal layer 35 are applied to the carrier 31 over the full surface area involved. Then the layer 35 is partially provided with diffractive structures by means of an embossing tool. The metal layer 35 is then printed upon with an etching resist, so that the only partially shaped layer 36 is formed.

The area which is not covered by the etching resist is then removed by etching.

Alternatively, it is also possible for the metal layer 5 to be demetallised or removed by ablation processes such as laser ablation, spark erosion, plasma or ion bombardment. It is possible by means of such ablation processes to transfer digitally stored images, texts and codes.

A partial thin film element is now introduced into the intermediate spaces formed in that way between the partial layers 35 and 36. In this case, the layers of the partial thin film element can be applied by vapor deposition with suitably shaped vapor deposition masks or by printing on the layers, in the region of the intermediate spaces.

It is further possible that, as shown in FIG. 3, partial regions of the intermediate spaces are not covered by the partial thin film element and that therefore affords a transparent window. When the adhesive layer is applied the adhesive layer is of a correspondingly thicker configuration at those locations, as shown in FIG. 3.

Figure 4:
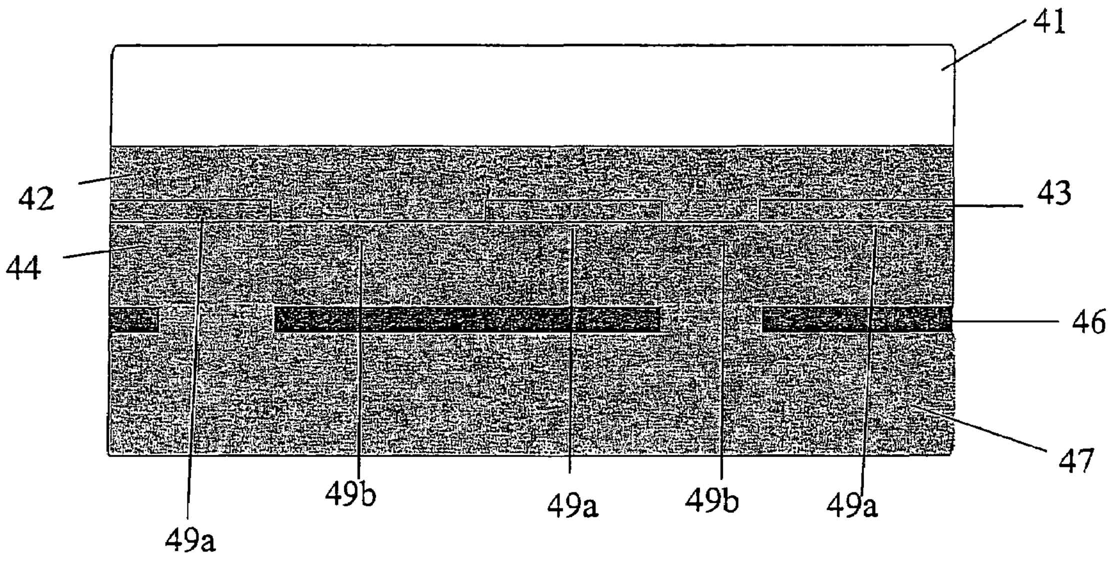
FIG. 4 shows a view in section through an optically variable element according to the invention for a further embodiment of the invention.

FIG. 4 shows an optically variable element in which a surface region delimited by a partial thin film element, of the optically variable element has a spacer layer but not an absorption layer.

FIG. 4 shows a carrier 41, five layers 42 through 47 and a plurality of surface regions 49*a* and 49*b*.

The layer 42 is a protective lacquer and/or release layer, and the layer 43 is an absorption layer. The layer 44 is a spacer layer. The layer 46 is a metal layer or an HRI layer (HRI=High Refraction Index). The layer 47 is an adhesive layer.

To produce that layer structure, the protective lacquer and release layer 42 and the absorption layer 43 are applied to the carrier 41 over the full surface area involved. In this case the absorption layer 43 can be applied by vapor deposition or by a printing process.

The absorption layer is then partially removed in the surface regions 49*b*.

That partial removal of the absorption layer is effected by positive etching or negative etching. Thus, in the case of direct etching, an etching agent can be applied in the form of a pattern by a printing process, for example by means of a roller or by screen printing. It is also possible to apply an etching mask which is removed by a washing operation after the etching process.

It is further possible for the absorption layer to be removed by an ablation process such as laser ablation, spark erosion, plasma or ion bombardment. By means of such ablation processes it is possible to transfer digitally stored images, texts and codes.

Instead of the absorption layer being applied over the full surface area, it is also possible for the absorption layer to be applied only partially to the layer 42. That can be effected by vapor deposition by means of vapor deposition masks of a pattern configuration or by correspondingly pattern-shaped printing of the absorption layer 43 on the layer 42.

The spacer layer 44 is now applied over the full surface area involved, to the partially shaped absorption layer 43. The operation of applying the spacer layer can be effected for example by vapor deposition or by printing the absorption layer over the full surface area involved.

After that procedure the surface regions 49*a* are covered with a thin film comprising the absorption layer 43 and the spacer layer 44. That thin film (after application of the further layers which act as optical separation layers) produces color shifts which are dependent on the viewing angle, by means of interference, upon suitable incidence of light. The absorption layer 43 is not present in the surface regions 49*b* so that such color shifts cannot be produced there.

It is further possible for not only the absorption layer 43 but also the spacer layer 44 to be only partially applied to the absorption layer 43 or partially removed.

There is on the one hand the possibility of applying the spacer layer 44 to the partially shaped absorption layer 43 over the full surface area involved and then removing the spacer layer by one of the above-described processes (positive etching, negative etching, ablation) in register relationship with the partially shaped absorption layer.

There is also the possibility of applying the absorption layer 43 and the spacer layer 44 over the full surface area and then removing both layers jointly by one of the above-described processes (positive etching, negative etching, ablation).

There is also the possibility of printing on the spacer layer in register relationship with the partially shaped absorption layer, by means of a printing process.

Alternatively it is also possible for the surface regions, which are delimited by the partial thin film element, of the optically variable element to have an absorption layer but no spacer layer.

That can be achieved if the absorption layer is applied over the full surface area, for example by vapor deposition or printing. The spacer layer is then only partially applied by a printing process. Here too there is the possibility of the spacer layer being applied over the full surface area and then removed by one of the above-described processes (positive etching, negative etching, ablation).

There is also the possibility of the spacer layer or the absorption layer being altered in respect of its thickness by over-vapor deposition or over-printing, in such a way that it can no longer perform its function as an interference layer and is thus 'extinguished'.

The layer 46 is now applied to the layers 43 and 44 which have been applied and configured in the above-indicated fashion.

If the layer 46 is a reflection layer it preferably comprises a metal. That metal can also be colored. The materials that can be used are essentially chromium, aluminum, copper, iron, nickel, silver, gold or an alloy with those materials.

It is further possible in that case to apply highly shiny or reflective metal pigments which then form the reflection layer.

It is further possible for the layer 46 to be in the form of a partial metal layer. Here too there is the possibility that the layer 46 is first applied over the full surface area, for example by vapor deposition, and then removed by one of the above-described processes (positive etching, negative etching, ablation). If metal pigments are used as the reflective layer, that layer can be partially printed on, thereby then producing a partial reflective layer.

If the layer 46 is in the form of a transmission layer, in particular materials such as oxides, sulfides or chalcogenides can be used as materials for that layer. The crucial consideration in regard to the choice of the materials is that there is a difference in refractive index, in relation to the materials used in the spacer layer 44. That difference should be not less than 0.2. Depending on the respective material used for the spacer layer 44, an HRI material or an LRI material is thus used for the layer 46. In this case the transmission layer can also be formed by an adhesive layer which satisfies that condition in regard to refractive index.

An 'extinguishing effect' as described hereinbefore can further be achieved by partial application of the transmission layer. If the spacer layer is adjoined by a layer (for example an adhesive layer) which does not satisfy the above-described condition in regard to refractive index, the optical thickness of the spacer layer is increased and the visible interference effect no longer occurs.

Figure 5A:
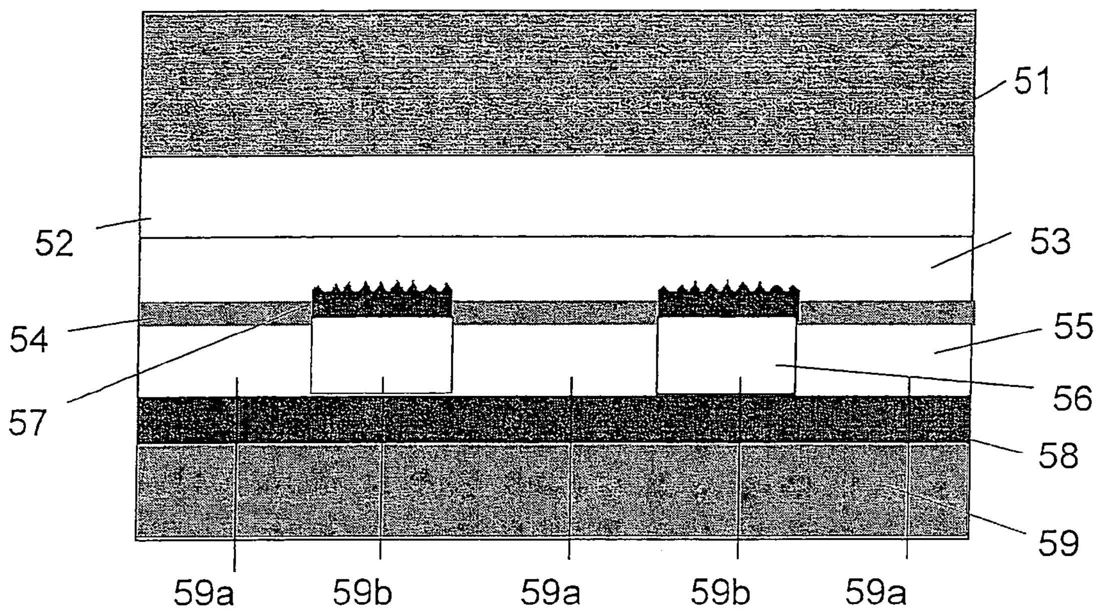
FIG. 5*a* shows a view in section through an optically variable element according to the invention for a further embodiment of the invention.
Figure 5B:
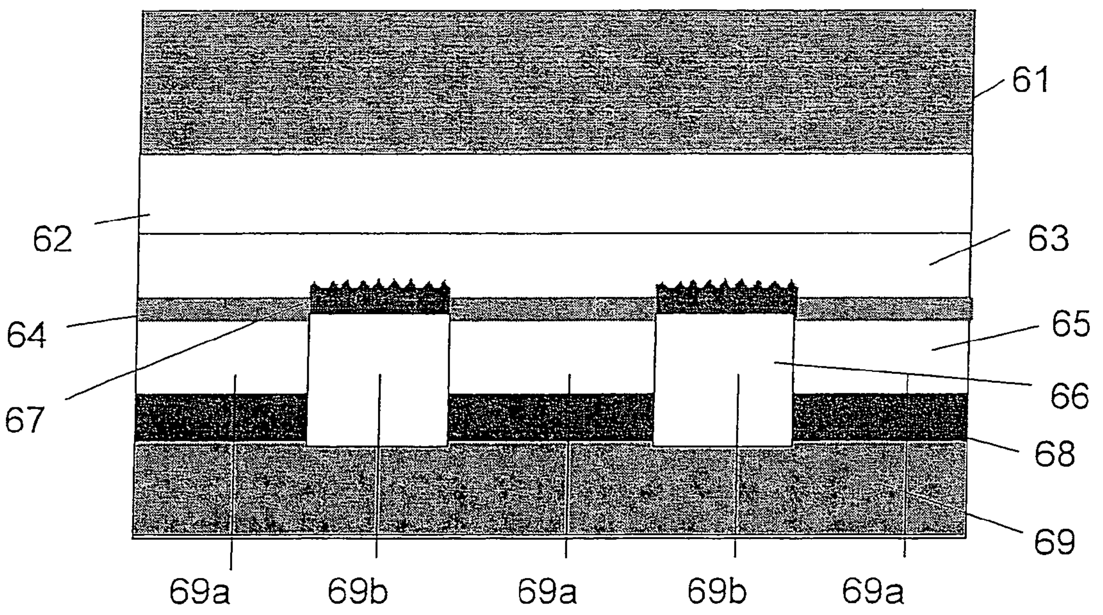
FIG. 5*b* shows a view in section through an optically variable element according to the invention for a further embodiment of the invention.
Figure 5C:
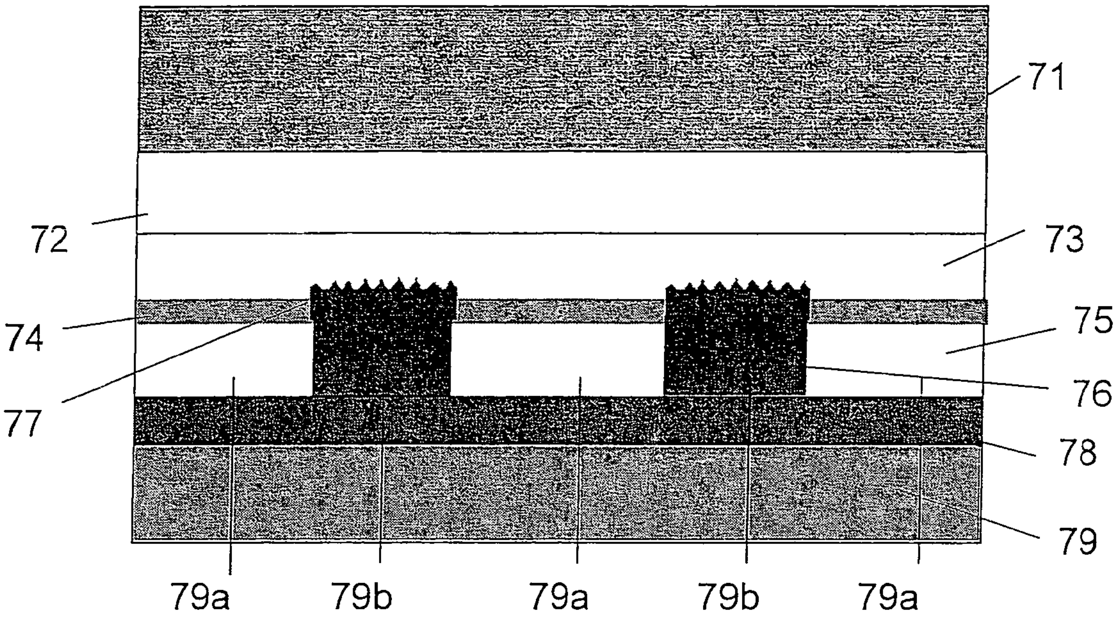
FIG. 5*c* shows a view in section through an optically variable element according to the invention for a further embodiment of the invention.

Reference is now made to FIGS. 5*a* through 5*c* to describe possible ways of applying one or more substitute layers which are provided with a diffractive structure, in the surface region of the optically variable element, which surface region is delimited by a partial thin film element.

FIG. 5*a* shows a carrier 51, eight layers 52 through 59 and a plurality of surface regions 59*a* and 59*b*. The layer 52 is a protective lacquer and/or release layer. The layer 53 is a replication layer. The layer 54 is an absorption layer. The layers 56 and 57 are substitute layers. The layer 58 is a metal layer or an HRI layer (HRI=High Refraction Index). The layer 59 is an adhesive layer.

The layers 52, 53, 54, 55, 58 and 59 are of the configuration as described in the embodiments shown in FIGS. 3 and 4 and are applied to the carrier 51 as described there.

The layer 53 comprises a replication lacquer or a thermally shapable plastic material. Diffractive structures are now embossed into the layer 53 in the surface regions between the partial thin film layer. That embossing operation is advantageously carried out before the layers 54 and 55 are applied.

Instead of an embossing operation the diffractive structure can also be applied to the surface of the layer 53 by means of a laser.

The layer 57 which is preferably a metal layer is then applied in the surface regions 59*b*.

In this case, that metallisation can be applied by vapor deposition using a mask prior to or after forming the partial thin film element.

It is further possible for metallisation over the full surface area to be applied to the layer 53, and for that metallisation to be removed by means of one of the above-described processes (positive etching, negative etching, ablation) partially in the surface regions 59*a*, that is to say in the region of the partial thin film element. In this case that step is effected before the partial thin film element is produced.

The embossing operation can also be effected only after the layer 57 has been applied.

The substitute layer 56 can comprise the same material as the spacer layer 55, which has the advantage that it is possible to forego partially applying the spacer layer 55 and the substitute layer 56.

FIG. 5*b* shows a carrier 61, eight layers 62 through 69 and a plurality of surface regions 69*a* and 69*b*. The layer 62 is a protective lacquer and/or release layer. The layer 63 is a replication layer. The layer 64 is an absorption layer. The layers 66 and 67 are substitute layers. The layer 58 is a metal layer or an HRI layer (HRI=High Refraction Index). The layer 59 is an adhesive layer.

The layers 62, 63, 64, 65, 68 and 69 are of the configuration as described in the embodiments shown in FIGS. 3 and 4 and are applied to the carrier 61 as described therein.

The layer 63 comprises a replication lacquer or a thermally shapable plastic material. The layer 63 is provided with a diffractive structure and in the surface regions 69*a* with the layer 67, as described in the description relating to FIG. 5*a*.

In contrast to the embodiment illustrated in FIG. 5*a* the layer 68 is of an only partial nature. That can be achieved by partial application of the layer 68, effected as described hereinbefore. It is further possible that, upon vapor deposition of the layer 68, the layer 67 is also produced by vapor deposition in parallel, and then the layer 66 is partially applied. The layer 66 however can also be part of the adhesive layer 69 (see also the description relating to FIG. 3).

FIG. 5*c* shows a carrier 71, eight layers 72 through 79 and a plurality of surface regions 79*a* and 79*b*. The layer 72 is a protective lacquer and/or release layer. The layer 73 is a replication layer. The layer 74 is an absorption layer. The layers 76 and 77 are substitute layers. The layer 78 is a metal layer or an HRI layer (HRI=High Refraction Index). The layer 79 is an adhesive layer.

The layers 72, 73, 74, 75, 78 and 79 are of the configuration as described in the embodiments shown in FIGS. 3 and 4 and are applied to the carrier 71 as described therein.

The layer 73 comprises a replication lacquer or a thermally shapable plastic material. The layer 73 is provided with a diffractive structure and in the surface regions 79*a* with the layer 77, as described in the description relating to FIG. 5*a*.

In contrast to the embodiments illustrated in FIGS. 5*a* and 5*b* the layers 77 and 76 are both metal layers. Thus for example the metal layer 77 is applied as described with reference to FIG. 5*a*, and provided with a diffractive structure. By virtue of a clever choice of the material for the spacer layer 75, it is possible to provide that it has metallic properties in the surface regions 79*b*. The metal layer 79 is then applied over the full surface area.

It will be appreciated that it is also possible for the layers 77 and 76 to be applied as a single metal layer, just with the greater layer thickness which can be seen from FIG. 5*c*, as described in the description relating to FIG. 5*a*.

Figure 6A:
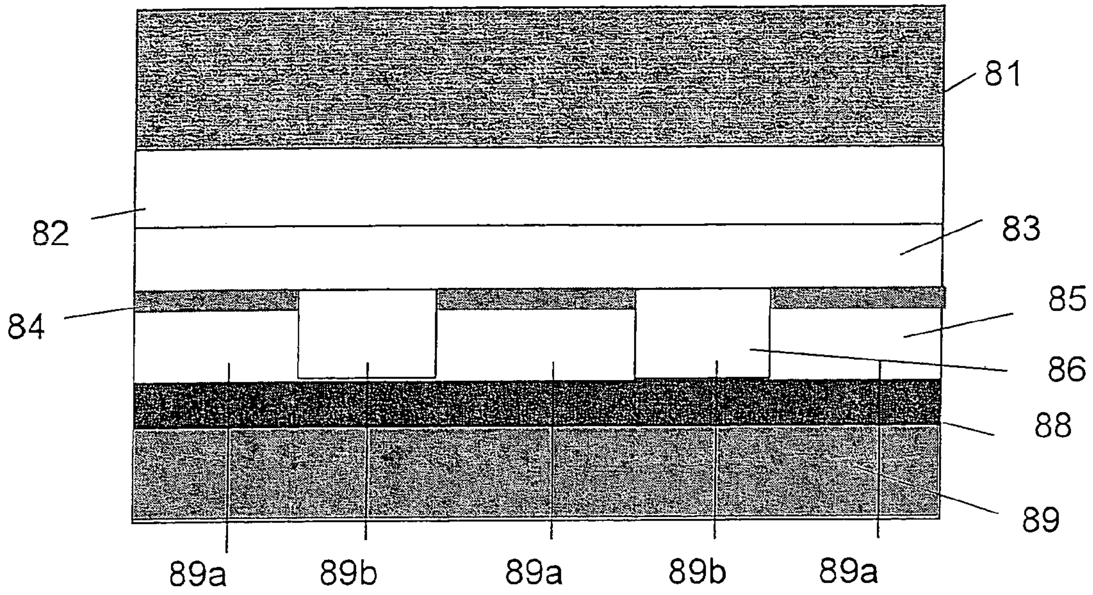
FIG. 6*a* shows a view in section through an optically variable element according to the invention for a further embodiment of the invention.
Figure 6B:
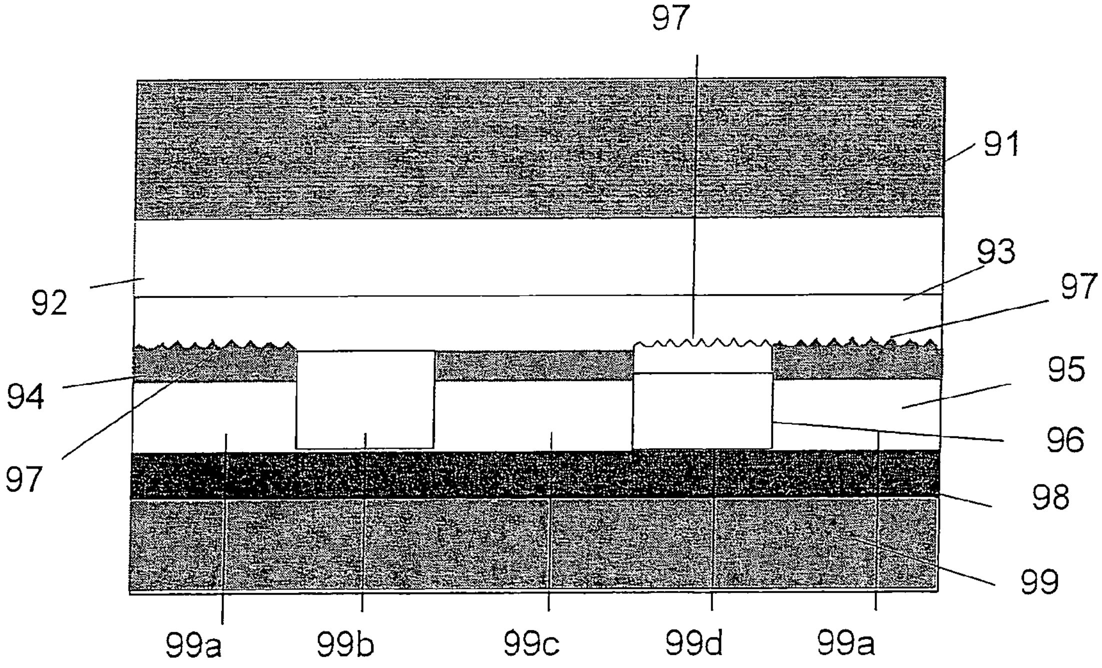
FIG. 6*b* shows a view in section through an optically variable element according to the invention for a further embodiment of the invention.

Reference is now made to FIGS. 6*a* and 6*b* to describe possible ways in which one or more transparent substitute layers can be provided in the surface region of the optically variable element, which surface region is delimited by a partial thin film element.

FIG. 6*a* shows a carrier 81, seven layers 82 through 89 and a plurality of surface regions 89*a* and 89*b*. The layer 82 is a protective lacquer and/or release layer. The layer 83 is a replication layer. It would also be possible in this case to forego that layer. The layer 84 is an absorption layer. The layer 86 is a substitute layer. The layer 88 is a metal layer. The layer 89 is an adhesive layer.

The layers 82, 83, 84, 85, 88 and 89 are of the configuration as described in the embodiments shown in FIGS. 3 and 4 and are applied to the carrier 81 as described there.

The substitute layer 86 is formed by a transmissive material. That material can also be the same material as the material used for the spacer layer 85. In that way, it is possible to forego partial application of the layers 85 and 86, as already described in the description relating to FIG. 5*a*.

FIG. 6*b* shows a carrier 91, seven layers 92, 93, 94, 95, 96, 98 and 99, diffractive structures 97 and a plurality of surface regions 99*a* through 99*d*. The layer 92 is a protective lacquer and/or release layer. The layer 93 is a replication layer. The layer 94 is an absorption layer. The layer 96 is a substitute layer. The layer 98 is a metal layer. The layer 99 is an adhesive layer.

The layers 92, 93, 94, 95, 98 and 99 are of the configuration as described in the embodiments shown in FIGS. 3 and 4 and are applied to the carrier 91, as described there. The substitute layer 96 is of the configuration as stated in relation to FIG. 6*a*.

Prior to application of the layer 94 and/or the layer 96, the diffractive structures 97 are applied to the surface of the layer 93 by means of an embossing tool or one of the other above-described processes. As can be seen from FIG. 6*b*, in this case the diffractive structures 97 can be applied both in surface regions which are covered by the partial thin film element and also can be applied to those surface regions which are not covered by a partial thin film element.

Figure 7:
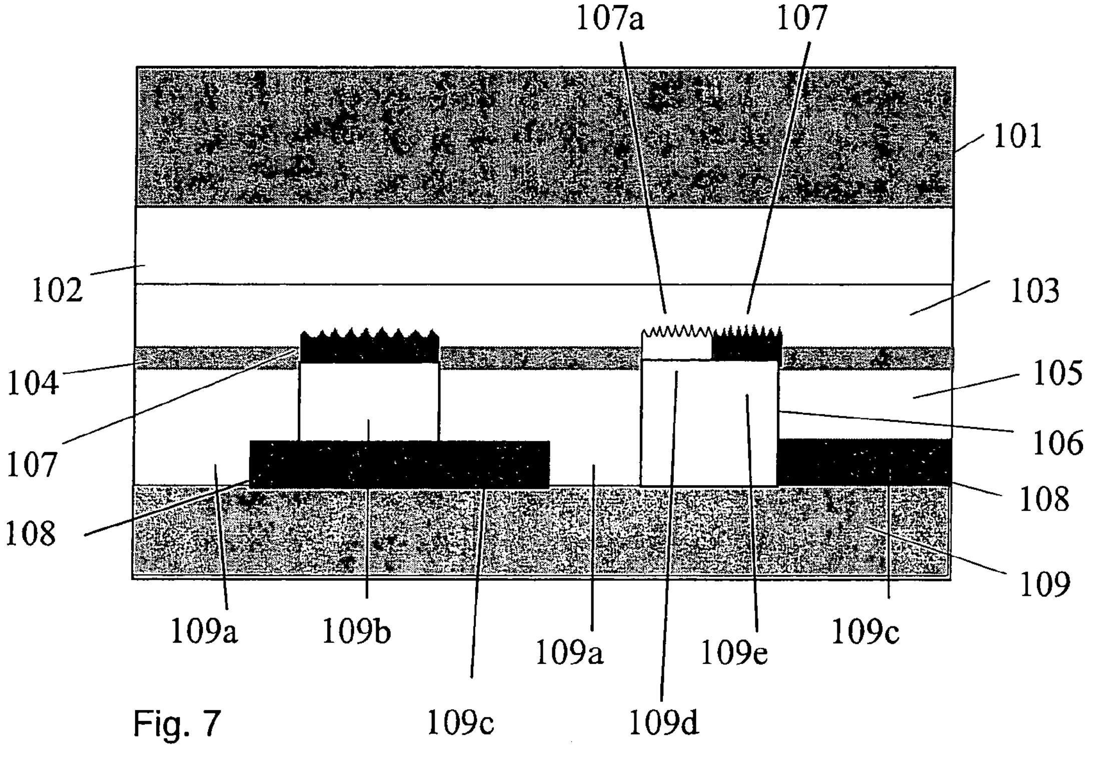
FIG. 7 shows a view in section through an optically variable element according to the invention for a further embodiment of the invention.
Figure 8:
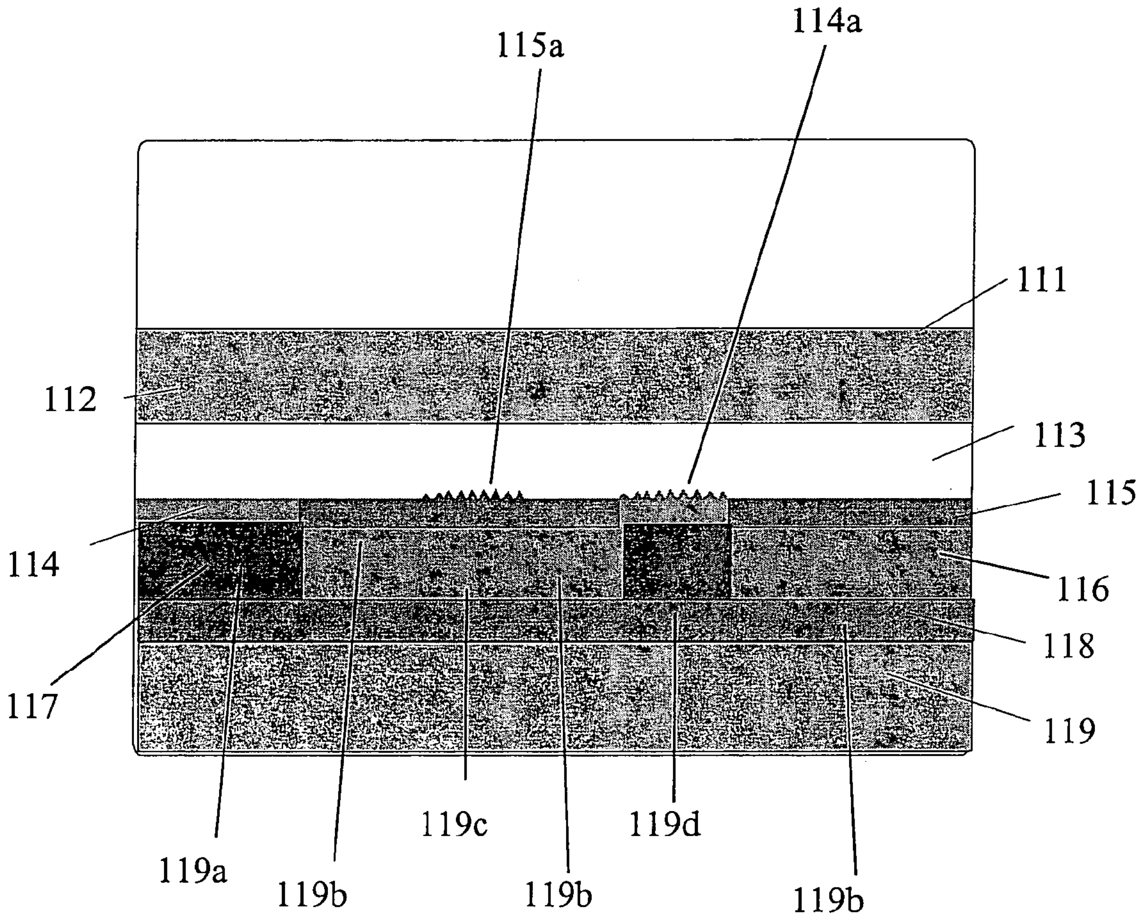
FIG. 8 shows a view in section through an optically variable element according to the invention for a further embodiment of the invention.

FIGS. 7 and 8 show some possible ways of combining a partial thin film element with partial diffractive structures and partial metallisation.

FIG. 7 shows a carrier 101, nine layers 102 through 109 and a plurality of surface regions 109*a* through 109*d*. The layer 102 is a protective lacquer and/or release layer. The layer 103 is a replication layer. The layer 104 is an absorption layer. The layers 106, 107 and 107*a* are substitute layers. The layer 108 is a metal layer. The layer 109 is an adhesive layer.

The layers 102, 103, 104, 105, 108 and 109 are of the configuration as described with reference to FIGS. 3 and 4 and are applied to the carrier 101 as described there.

The substitute layer 107 is a metal layer which can be constructed as described in the embodiments shown in FIGS. 5*a* and 5*b*. The substitute layers 106 and 107*a* are formed by a transmissive material. They are of the structure as described in the embodiments illustrated in FIGS. 6*a* and 6*b*.

As can be seen from FIG. 7 a diffractive structure is further applied to the layer 103 in the surface regions 109*b*, 109*d* and 109*e*.

FIG. 8 shows a carrier 111, eight layers 112 through 119 and a plurality of surface regions 119*a* and 119*b*. The layer 112 is a protective lacquer and/or release layer. The layer 113 is a replication layer. The layer 114 is an absorption layer. The layer 117 is a spacer layer. The layers 116 and 115 are substitute layers. The layer 118 is a metal layer. The layer 119 is an adhesive layer.

The layers 112, 113, 114, 117, 118 and 119 are of the configuration as described in the embodiments shown in FIGS. 3 and 4 and are applied to the carrier 111 as described there.

The substitute layer 115 is a metal layer which can be of the configuration as described in the embodiments shown in FIGS. 5*a* and 5*b*. The substitute layer 116 is formed by an etching resist (see also the description relating to the embodiment of FIG. 3).

As can be seen from FIG. 8 a diffractive structure 115*a* and 114*a* respectively is further applied to the layer 113 in the surface regions 119*c* and 119*d*.

The above-described possible processes make it possible to produce suitably adapted individual elements such as a partial thin film element, a partial structuring (for example diffractive structures), a partial metallisation and a partial transparent window in a degree of positioning accuracy of 0.2 mm in any positional combination in the form of a continuous or extensive image pattern.

What is claimed is:

1. An optically variable element comprising:

a thin film in the form of a partial thin film element for producing color change by means of interference, and a further layer comprising a surface region, wherein the partial thin film element comprises a surface region and a transparent spacer layer having a thickness which produces a color change, and wherein the partial thin film element covers the surface region of the further layer in a region-wise and pattern-shaped manner.

2. An optically variable element as set forth in claim 1, wherein the partial thin film element further comprises an absorption layer.

3. An optically variable element as set forth in claim 1, wherein the partial thin film element further comprises a plurality of layers of different refraction.

4. An optically variable element as set forth in claim 1, wherein the partial thin film element further comprises a reflective layer.

5. An optically variable element as set forth in claim 4, wherein the reflective layer is a metal layer.

6. An optically variable element as set forth in claim 1, wherein the partial thin film element further comprises a diffractive structure for producing diffraction effects.

7. An optically variable element as set forth in claim 1, wherein the partial thin film element further comprises a partial reflective layer, which partially covers the surface region of the partial thin film element.

8. An optically variable element as set forth in claim 7, wherein the partial reflective layer is a metal layer.

9. An optically variable element as set forth in claim 1, wherein the surface region of the further layer, which is delimited by the partial thin film element, comprises an absorption layer.

10. An optically variable element as set forth in claim 1, wherein the surface region of the further layer, which is delimited by the partial thin film element, comprises a spacer layer.

11. An optically variable element as set forth in claim 1, wherein the further layer is a full-area transparent layer.

12. An optically variable element as set forth in claim 1, wherein the further layer is a full-area reflection layer.

13. An optically variable element as set forth in claim 12, wherein the full-area reflection layer is a metal layer.

14. An optically variable element as set forth in claim 1, wherein the further layer is a full-area adhesive layer.

15. A security product having an optically variable element as set forth in claim 1.

16. A foil comprising an optically variable element as set forth in claim 1.

17. A foil as set forth in claim 16, wherein the foil is an embossing foil or a laminating foil.

18. An optically variable element as set forth in claim 1, wherein the full-area transparent layer is a protective lacquer layer.

19. An optically variable element comprising:

a thin film in the form of a partial thin film element for producing color change by means of interference, wherein the partial thin film element comprises a surface region and a partial diffractive structure for producing diffraction effects, which partially covers the surface region of the partial thin film element, and a further layer comprising a surface region, wherein the partial thin film element covers the surface region of the further layer in a region-wise and pattern-shaped manner.

20. An optically variable element comprising:

a thin film in the form of a partial thin film element for producing color change by means of interference, wherein the partial thin film element comprises a surface region, and a further layer comprising a surface region, wherein the partial thin film element covers the surface region of the further layer in a region-wise and pattern-shaped manner, and wherein the surface region of the further layer, which is delimited by the partial thin film element, comprises one or more substitute layers which replace the thin film layer succession of the partial thin film element in said surface region of the further layer.

21. An optically variable element as set forth in claim 20, wherein the surface region of the further layer delimited by the partial thin film element is enclosed by the partial thin film element or encloses the partial thin film element.

22. An optically variable element as set forth in claim 20, wherein the one or more substitute layers have an overall layer thickness which approximately corresponds to the layer thickness of the partial thin film element.

23. An optically variable element as set forth in claim 20, wherein at least one of the one or more substitute layers comprises a diffractive structure for producing diffraction effects.

24. An optically variable element as set forth in claim 20, wherein the one or more substitute layers comprise a reflection layer and a carrier layer.

25. An optically variable element as set forth in claim 24, wherein the reflection layer is a metal layer.

26. An optically variable element as set forth in claim 20, wherein the one or more substitute layers comprises a single reflection layer.

27. An optically variable element as set forth in claim 26, wherein the single reflection layer is a metal layer.

28. An optically variable element as set forth in claim 20, wherein the one or more substitute layers are transparent layers.

29. An optically variable element as set forth in claim 20, wherein at least one of the one or more substitute layers comprises a surface region and a partial reflective layer, in particular a metal layer, which partially covers the surface region of the at least one of the one or more substitute layers.

30. An optically variable element as set forth in claim 20, wherein at least one of the one or more substitute layers comprises a surface region and a partial diffractive structure for producing diffraction effects, which partially covers the surface region of the at least one of the one or more substitute layers.

* * * * *